United States Patent [19]

Okazaki et al.

[11] Patent Number: 4,996,719
[45] Date of Patent: Feb. 26, 1991

[54] OPTICAL COMMUNICATION APPARATUS FOR MOTOR VEHICLE

[75] Inventors: Kunio Okazaki, Hadano; Kiyomitsu Ishikawa, Tokyo, both of Japan

[73] Assignee: Stanley Electric Co., Ltd., Tokyo, Japan

[21] Appl. No.: 311,532

[22] Filed: Feb. 15, 1989

[30] Foreign Application Priority Data

Feb. 26, 1988 [JP] Japan ............................. 63-24903[U]

[51] Int. Cl.⁵ ........................ H04B 10/14; H04J 14/02
[52] U.S. Cl. ..................................... 455/606; 455/603; 370/3
[58] Field of Search ............... 455/606, 607, 609, 610, 455/613, 617, 603; 370/3

[56] References Cited

FOREIGN PATENT DOCUMENTS 0019245 1/1986 Japan ................................. 455/606
2079088 1/1982 United Kingdom ................ 455/607

Primary Examiner—Reinhard J. Eisenzopf
Assistant Examiner—L. Van Beek
Attorney, Agent, or Firm—Frishauf, Holtz, Goodman & Woodward

[57] ABSTRACT

An optical communication apparatus for motor vehicles comprises a light emitting diode of a rear combination lamp, marker lamp or the like, used as a light emitting element; a light receiving element provided near or at the light emitting element; a transmitter coupled to the light emitting element; and a receiver coupled to the light receiving element.

15 Claims, 1 Drawing Sheet

OPTICAL COMMUNICATION APPARATUS FOR MOTOR VEHICLE

BACKGROUND OF THE INVENTION

The present invention relates to an optical communication apparatus mounted on motor vehicles for optical communication among them.

If a plurality of persons move from one location to another location, a plurality of motor vehicles are used. In such a case, communication among them may be required sometimes during such a trip, which communication should be kept secret to third parties.

If radio communication is used among motor vehicles, there is a risk of the content of the communication being picked up by third parties, posing a problem of unauthorized access to a secret communication by such third parties.

SUMMARY OF THE INVENTION

It is therefore an object of the present invention to provide an optical communication apparatus for motor vehicles capable of maintaining secrecy of communications among them.

According to an aspect of the present invention, an optical communication apparatus for motor vehicles comprises light emitting means in a rear combination lamp, marker lamp or the like for use as a light emitting element; a light receiving means near or at said light emitting means; transmitting means coupled to said light emitting means; and receiver means coupled to light receiving means.

BRIEF DESCRIPTION OF THE DRAWINGS

The above and other objects and advantages of the present invention will be described in more detail in the following, by way of example, reference being made to the accompanying drawings, in which.

DETAILED DESCRIPTION

Figure 1:
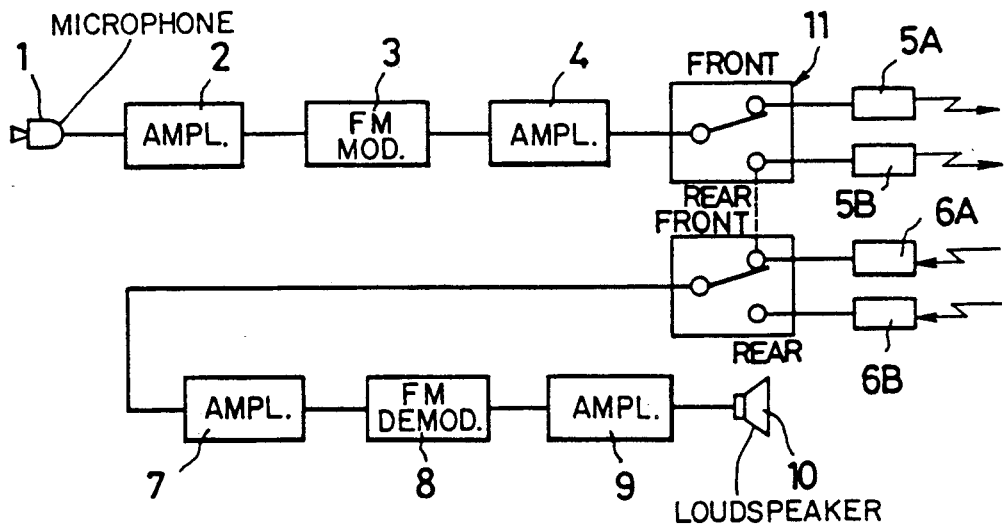
FIG. 1 is a block diagram showing an embodiment of an optical communication apparatus for a motor vehicle according to the present invention.

FIGS. 1 to 4 show an embodiment of the optical communication apparatus for a motor vehicle according to the present invention. Referring to the figures, reference numeral 1 represents a microphone, 2 an amplifier for amplifying a voice or audio signal, 3 an FM modulator for FM modulating the voice signal, 4 a power amplifier, and 5A and 5B light emitting elements driven by an output from the amplifier 4. The FM modulator 3 and the power amplifier 4 comprise a transmitting means. If a rear combination lamp (refer to FIG. 3) and front marker lamp (refer to FIG. 4) are constructed so as to comprise light emitting diodes (LEDs), then LEDs are used as the light emitting elements 5A and 5B.

6A and 6B represent light receiving elements such as photodiodes, 7 an amplifier for amplifying a received signal, 8 an FM demodulator for FM demodulating an output from the amplifier 7, 9 a voice or audio signal amplifier for amplifying a voice signal, and 10 a loudspeaker. The amplifier 7 and FM demodulator 8 comprise a receiver means. The light receiving elements 6A and 6B are mounted near or at the rear combination lamp (shown in FIG. 3) and marker lamp (shown in FIG. 4), respectively.

The front and rear light emitting elements 5A and 5B, and the front and rear light receiving elements 6A and 6B, are interchangeably switched by using a switch 11, respectively.

Figure 2:
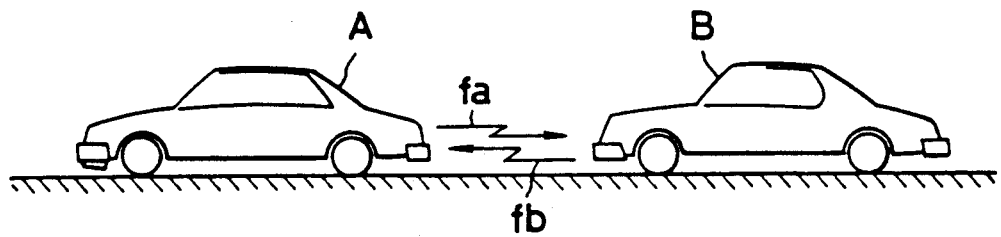
FIG. 2 is a side elevational view illustrating how optical communication is performed among motor vehicles.
Figure 3:
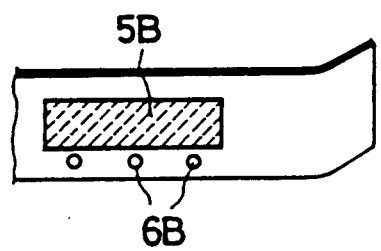
FIGS. 3 and 4 show the mounting condition of the light emitting and receiving elements of the illustrated embodiment of the present invention.
Figure 4:
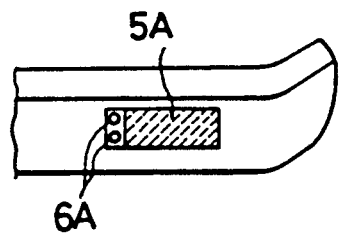

In operation, for example, for communication between motor vehicles A and B as shown in FIG. 2, light pulses of a carrier frequency fa modulated by voice are emitted from the light emitting element 5B of the motor vehicle A to the motor vehicle B. The light pulses are received by the light receiving element mounted at the front of the motor vehicle B, amplified, FM modulated, audioamplified, and supplied to the loudspeaker 10 to generate voice sounds.

On the contrary, light pulses of a carrier frequency fb are emitted out from the motor vehicle B to the motor vehicle A. The light pulses are received by the light receiving element mounted at the rear of the motor vehicle A, amplified, FM demodulated, audio-amplified, and supplied to the loudspeaker 10 to generate voice sounds.

Unless optical communication is not performed in a full duplex manner, a same carrier frequency can be used in sending and receiving light pulses.

As appreciated from the foregoing description of the present invention, although a service or communication area is limited because of optical communication, cross talk can be reduced. Further, as the light emitting element, the LEDs of the rear combination lamp and marker lamp can be used so that no additional light emitting element for such particular function need be used, resulting in low cost. In addition, by using different carrier frequencies in sending and receiving light pulses, optical communication can be realized simultaneously among motor vehicles.

Although the present invention has been described in connection with a preferred embodiment thereof with reference to the accompanying drawings, it will be apparent to those skilled in the art that various changes and modifications of the present invention are possible within the scope of the following claims.

We claim:

1. An optical communication apparatus for vehicles, comprising:

at least one of a rear combination lamp and a marker lamp on a first vehicle, said at least one of a rear combination lamp and marker lamp including a light emitting means for emitting a visually observable light signal;

a source of optical communication signals, including said light emitting means of said at least one of a rear combination lamp and a marker lamp of said first vehicle for use also for generating optical communications signals;

light receiving means on said first vehicle and located in the vicinity of said light emitting means for receiving from a light source in a second vehicle optical communications signals related to an original signal;

transmitting means on said first vehicle and coupled to said light emitting means for causing said light emitting means to also emit said optical communications signals; and receiver means coupled to said light receiving means for converting said received optical communications signals into substantially said original signal.

2. The optical communication apparatus of claim 1, wherein said light receiving means receives optical communications signals from said second vehicle.

3. The optical communication apparatus of claim 1, wherein said light receiving means on said first vehicle is located near said light emitting means of said first vehicle.

4. The optical communication apparatus of claim 1, wherein said light receiving means on said first vehicle is located adjacent to said light emitting means of said first vehicle.

5. The optical communication apparatus of claim 1, wherein said transmitting means includes:
   a microphone; and
   FM modulator means for receiving input signals from said microphone and coupled to said light emitting means for causing said light emitting means to generate said optical communications signals responsive to an FM modulated output of said FM modulator means.

6. The optical communication apparatus of claim 5, wherein said receiver means includes:
   FM demodulator means coupled to said light receiving means for FM demodulating optical communications signals received by said light receiving means; and
   audio output means coupled to said FM demodulator means for producing an audio output in accordance with an FM demodulated output of said FM demodulator means.

7. The optical communication apparatus of claim 5, wherein said receiver means includes:
   FM demodulator means coupled to said light receiving means for FM demodulating optical communications signals received by said light receiving means; and
   audio output means coupled to said FM demodulator means for producing an audio output in accordance with an FM demodulated output of said FM demodulator means.

8. The optical communication apparatus of claim 7, wherein said FM demodulator means and said FM modulator means operate with different carrier frequencies.

9. The optical communication apparatus of claim 7, wherein said FM demodulator means of different vehicles have different carrier frequencies.

10. The optical communication apparatus of claim 1, wherein said light emitting means comprises at least one light emitting diode (LED) serving for emitting said visually observable light signal for said at least one of said rear combination lamp and marker lamp and for emitting said optical communications signals.

11. The optical communication apparatus of claim 1, wherein said light receiving means comprises a plurality of closely adjacent photodiodes.

12. A method of optical communication between vehicles, comprising:
   providing at least one of a rear combination lamp and a marker lamp on a first vehicle, said at least one of a rear combination lamp and marker lamp including a light emitting means for emitting a visually observable light signal;
   providing a source of optical communications signals including said light emitting means of said at least one of a rear combination lamp and marker lamp, for use also for generating optical communication signals;
   generating an electrical communications signal containing original information to be transmitted from said first vehicle to a second vehicle;
   emitting an optical communications signal corresponding to said electrical communications signals by means of said light emitting means;
   receiving said optical communications signals at said second vehicle;
   converting said received optical communications signals at said second vehicle into a signal representative substantially of said original information;
   said second vehicle including light receiving means located in the vicinity of a light emitting means of said at least one of a rear combination lamp and marker lamp of said second vehicle.

13. The method of claim 12, wherein said optical communications signals emitted from said first vehicle has a carrier frequency which is different from an optical communications signals emitted from said second vehicle.

14. The optical communication method of claim 12, wherein said light emitting elements comprise at least one light emitting diode (LED) serving as both a light source of at least one of said rear combination lamp and marker lamp, and for generating said optical communications signals.

15. The optical communication method of claim 12, wherein the receiving step comprises providing a plurality of photodiodes closely adjacent to each other.

* * * * *